United States Patent
Iskowitz

(10) Patent No.: US 8,732,873 B2
(45) Date of Patent: May 27, 2014

(54) PORTABLE BABY CHANGING STATION FOR USE IN AUTOMOBILES

(71) Applicant: Rose Marie Iskowitz, Branchburg, NJ (US)

(72) Inventor: Rose Marie Iskowitz, Branchburg, NJ (US)

( * ) Notice: Subject to any disclaimer, the term of this patent is extended or adjusted under 35 U.S.C. 154(b) by 0 days.

(21) Appl. No.: 14/134,666

(22) Filed: Dec. 19, 2013

(65) Prior Publication Data

US 2014/0101860 A1    Apr. 17, 2014

Related U.S. Application Data

(63) Continuation of application No. 12/129,680, filed on May 30, 2008, now abandoned.

(51) Int. Cl.
*B60R 7/04* (2006.01)

(52) U.S. Cl.
USPC ............................ 5/118; 5/655; 5/652; 5/657

(58) Field of Classification Search
USPC ......... 5/655, 118, 657, 652; 296/37.13, 37.16
See application file for complete search history.

(56) References Cited

U.S. PATENT DOCUMENTS

| | | | | |
|---|---|---|---|---|
| 5,547,187 A * | 8/1996 | Spykerman | ................ | 296/37.16 |
| 5,649,658 A * | 7/1997 | Hoffman et al. | ................ | 224/576 |
| 5,716,091 A * | 2/1998 | Wieczorek | ................ | 296/37.16 |
| 6,193,118 B1 * | 2/2001 | Kearl | ................ | 224/153 |
| 6,298,993 B1 * | 10/2001 | Kalozdi | ................ | 206/581 |
| 6,327,726 B1 * | 12/2001 | Weber | ................ | 5/655 |
| 6,694,552 B1 * | 2/2004 | Vickers | ................ | 5/655 |
| 7,065,814 B2 * | 6/2006 | Rutkowski | ................ | 5/655 |
| 2004/0217616 A1 * | 11/2004 | Haspel et al. | ................ | 296/37.13 |
| 2005/0081297 A1 * | 4/2005 | Woodward et al. | ................ | 5/655 |
| 2007/0214573 A1 * | 9/2007 | Soloway | ................ | 5/655 |
| 2009/0178203 A1 * | 7/2009 | Homan | ................ | 5/655 |
| 2009/0178204 A1 * | 7/2009 | Sager | ................ | 5/655 |

* cited by examiner

*Primary Examiner* — William Kelleher
(74) *Attorney, Agent, or Firm* — Law Office of Mark Brown, LLC; Christopher M. De Backer

(57) ABSTRACT

A portable baby changing station fabricated from a soft, flexible material for changing diapers in automobiles. When fully extended, it provides a soft surface to rest a baby while changing a diaper. In this mode, the head end is affixed to the rear portion of the back seat by a fastener such as Velcro. One or more netted pockets are positioned at the head end to hold diapers and changing supplies. Once the baby has a new diaper, the changing station folds up into a compact shape while remaining fastened to the back seat. It is held in the closed position by fasteners such as Velcro or snaps. It is always affixed to the automobile, and always ready to unfold.

16 Claims, 6 Drawing Sheets

PORTABLE BABY CHANGING STATION FOR USE IN AUTOMOBILES

CROSS-REFERENCES TO RELATED APPLICATIONS

This application is a continuation of and claims priority in U.S. patent application Ser. No. 12/129,680, filed May 30, 2008, which is incorporated by reference. The material contained in this present application was first taught and disclosed in its entirety in U.S. Provisional Patent Application 60/916,173, filed May 4, 2007. Said U.S. Provisional Patent Application is incorporated by reference herein in its entirety.

BACKGROUND OF THE INVENTION

1. Field of the Invention

This application relates to a diaper changing station and more specifically to a diaper changing station to be used within a motor vehicle's interior space when the vehicle is stationary.

2. Background and Description of the Related Art

Baby changing stations are in common use in the United States and in many other countries. Their primary objective is to provide a surface upon which a baby can rest, said surface being situated at a convenient position to facilitate changing the baby's diaper. Most stations are usually located in home nurseries and in public restrooms. Their primary objective is to place the baby resting surface at a convenient height. The surface may or may not have a soft pad or mattress upon which the baby can rest. However, the changing stations described above, while they can be mobile, are not portable. Examples of restroom or wall-mounted changing stations are disclosed in U.S. Pat. Nos. 5,754,999, 6,049,928, 6,055,688, and 6,859,966 all issued to Helmsderfer, U.S. Pat. No. 6,151,737 issued to Henninge, U.S. Pat. No. 6,256,803 issued to Sauerbrei, and U.S. Pat. No. 7,131,155 issued to Fernandez. In addition, they were disclosed in U.S. Patent Application Publication Nos. 2004/0078859 and 2005/0138735, both by Helmsderfer. U.S. Design Pat. No. 0302,088 issued to Burt as well as 0378,966 and 0391,794 both issued to Helmsderfer show the appearance of such wall-mounted stations.

Portable baby changing stations have also been disclosed in U.S. patent literature. When people travel with babies, it is generally undesirable to rest a baby on a desk, table, or floor or directly on an automobile seat in order to change a diaper. It is certainly unacceptable to rest the baby on the ground. An example of a portable baby changing station for general use while traveling is U.S. Pat. No. 4,781,277 issued to Lim. Here, Lim discloses a nappy or diaper changing bag is made from a soft quilted plastic material and comprises two closable storage compartments connected at their undersides by a mat on which the baby being changed is placed. It is carried as a tote bag, and it unfolds to create the changing station. In U.S. Pat. No. 6,327,726 issued to Weber, the inventor disclosed a soft baby changing station having utility pockets that is used as a hammock between two rows of seats in an automobile. U.S. Pat. No. 6,421,856 issued to Furnback discloses a rigid automobile changing station. U.S. Pat. No. 6,497,441 issued to Mahmood, et. al. and U.S. Pat. No. 6,588,821 issued to Worrell, et. al. both disclose the same rigid changing station designed to be used in a vehicle. U.S. Pat. No. 5,852,838 issued to Johnson discloses a cushion for use with sloped vehicle seats, to provide a substantially level and horizontal surface upon which to change infant's diapers.

Parents travel with infants on a daily basis both on short and long trips. They take their children to the supermarket, the mall, the beauty salon, etc. The automobile stations noted above need to be mounted in the automobile, and are not very convenient to use. The nappy changing station of Lim that converts to a tote bag is considerably more convenient, but is still bulky. An active mother who takes her baby with her on all her daily errands must be prepared to change diapers often. The safest, cleanest and easiest place for her to change the diaper is in the comfort of her car. A baby changing station needs to be soft and flexible and should be able to be rolled for storage and unrolled for changing diapers. The changing station should be able to be placed on an automobile seat or on the rear inside surface of a hatchback or SUV. It should also have pockets for diapers, wipes, baby ointments, etc. However, it should be able to be affixed to the car so that a parent can leave the house without a diaper bag, knowing that if the baby needs a change, the supplies are already in the car.

SUMMARY OF THE INVENTION

The present invention is a soft flexible mat with pockets that can be unrolled for changing a baby's diaper and can be rolled for convenient storage. Once rolled, it has a fastening element that will retain the rolled condition. The fastening element may be, but is not limited to, fabric hook-and-loop fasteners such as Velcro. Another fastening element can affix the changing station to a hatch back portion of an SUV, minivan, or station wagon. Yet another fastening element can affix the changing station to a convenient handle within the vehicle for storage.

DETAILED DESCRIPTION OF THE PREFERRED EMBODIMENTS

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, base, front, back, right and left refer to the invention as oriented in the view being referred to. The words "inwardly" and "outwardly" refer to directions toward and away from, respectively, the geometric center of the embodiment being described and designated parts thereof. Forwardly and rearwardly are generally in reference to the direction of travel, if appropriate. Said terminology will include the words specifically mentioned, derivatives thereof and words of similar meaning

II. Preferred Embodiment

Figure 1:
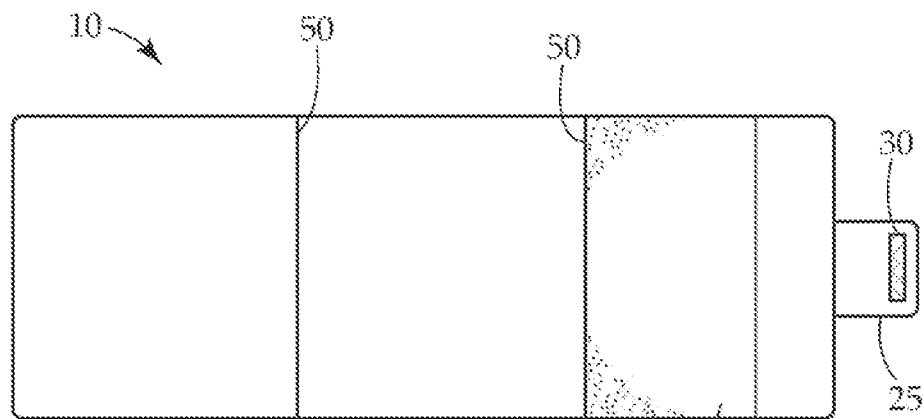
FIG. 1 is a top plan view of the baby changing station.
Figure 2:
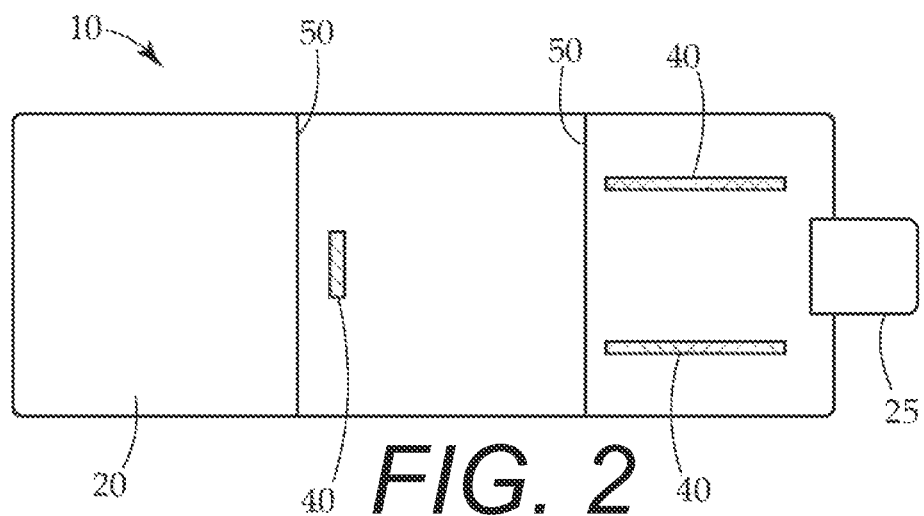
FIG. 2 is a bottom plan view of the baby changing station.
Figure 3:
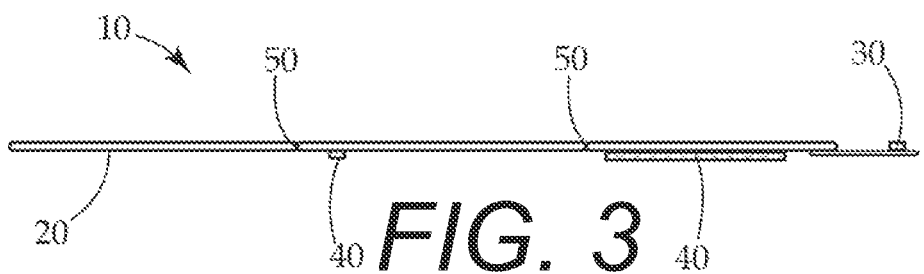
FIG. 3 is a side elevation of the baby changing station.
Figure 4:
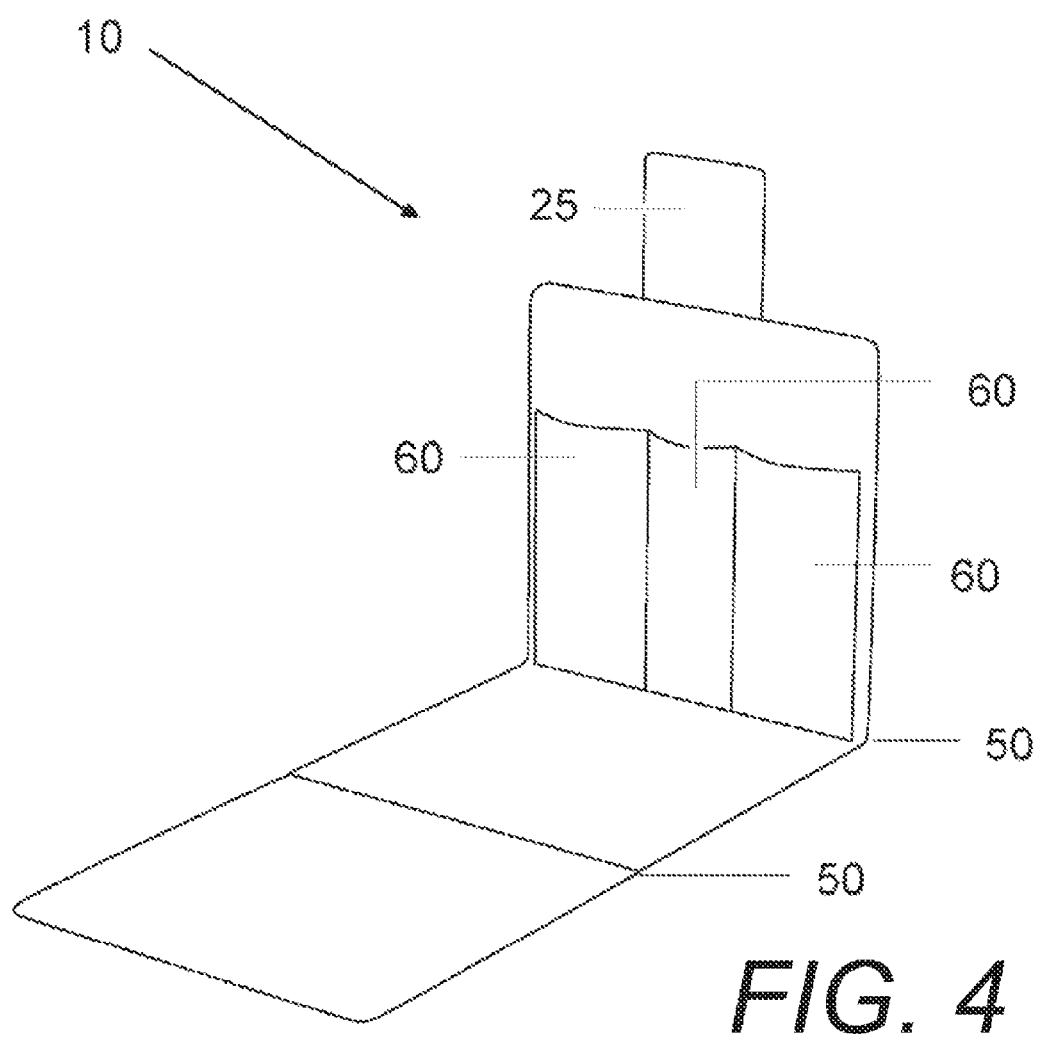
FIG. 4 is an isometric view of the front of the baby changing station mostly unfolded.
Figure 5:
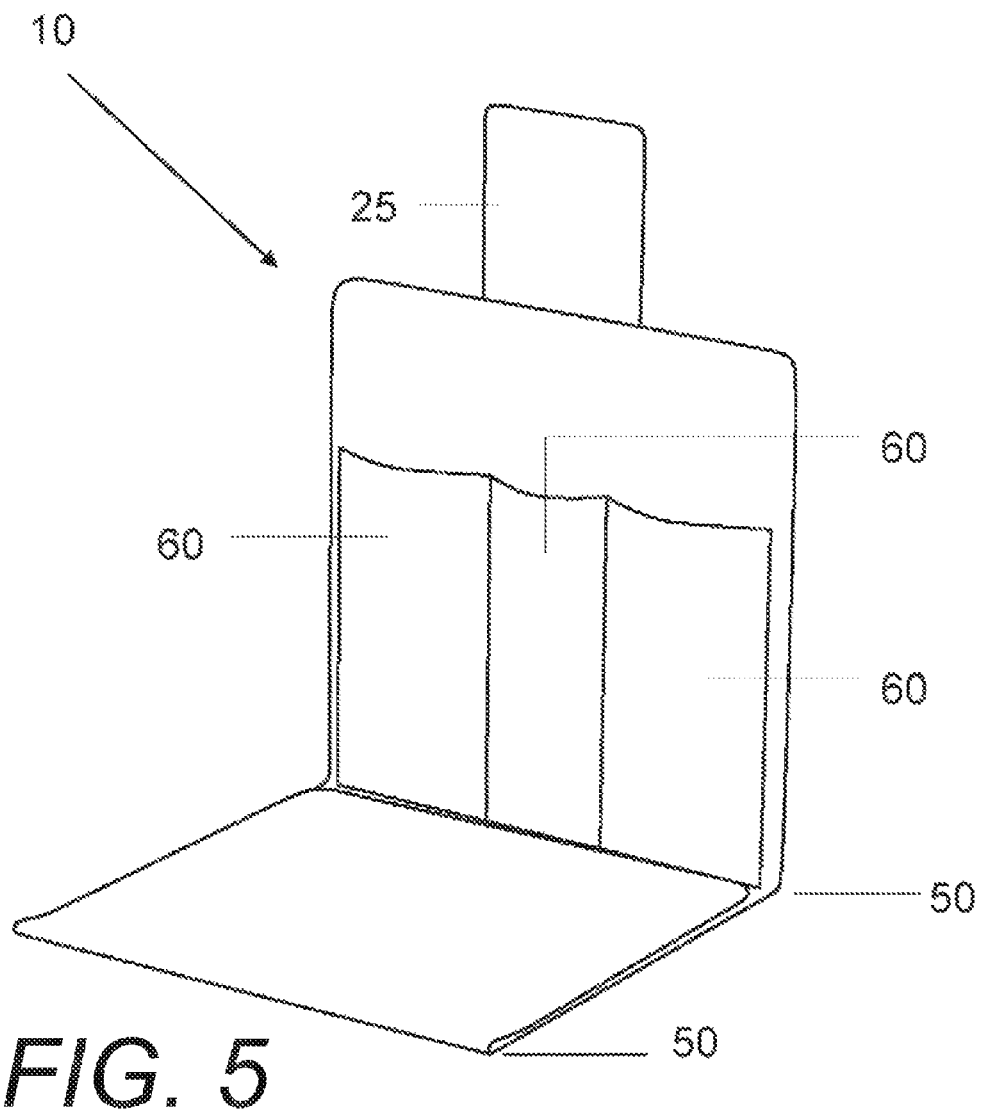
FIG. 5 is an isometric view of the front of the baby changing station partially folded.
Figure 6:
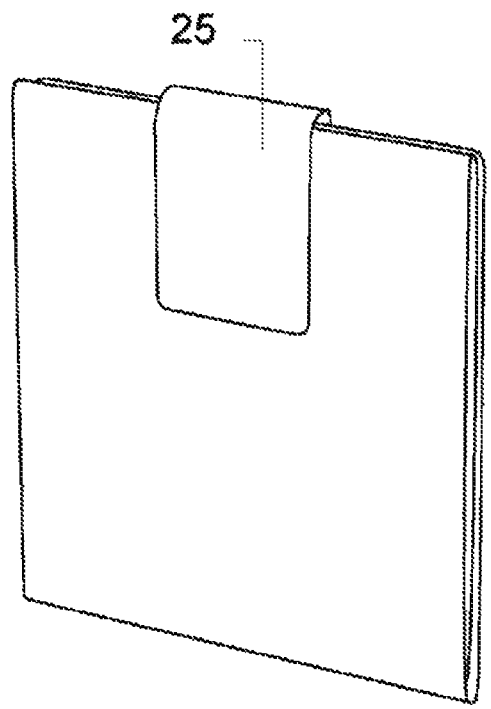
FIG. 6 is an isometric view of the front of the baby changing station fully folded.
Figure 7:
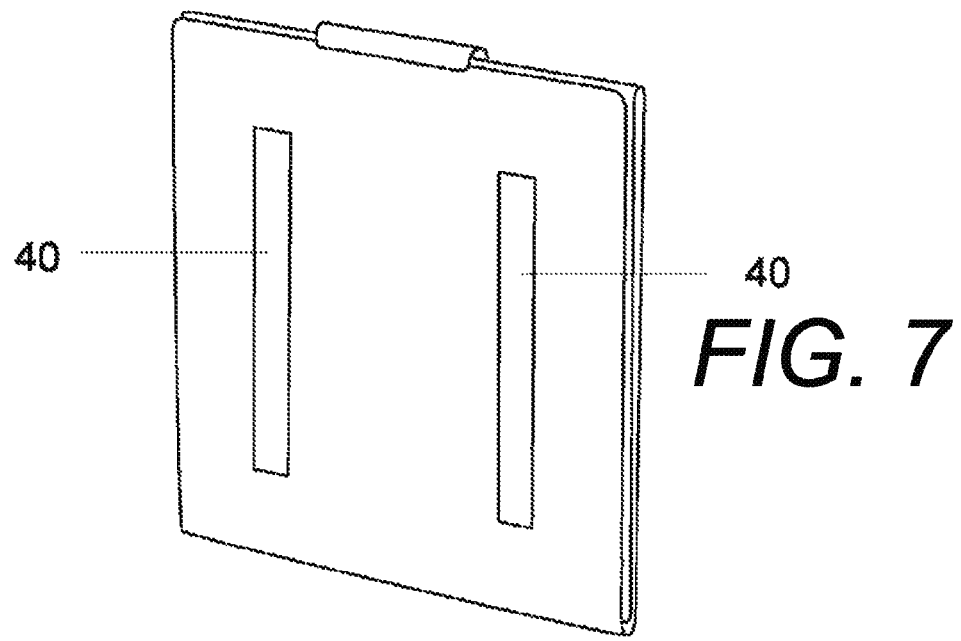
FIG. 7 is an isometric view of the rear of the baby changing station fully folded.
Figure 8:
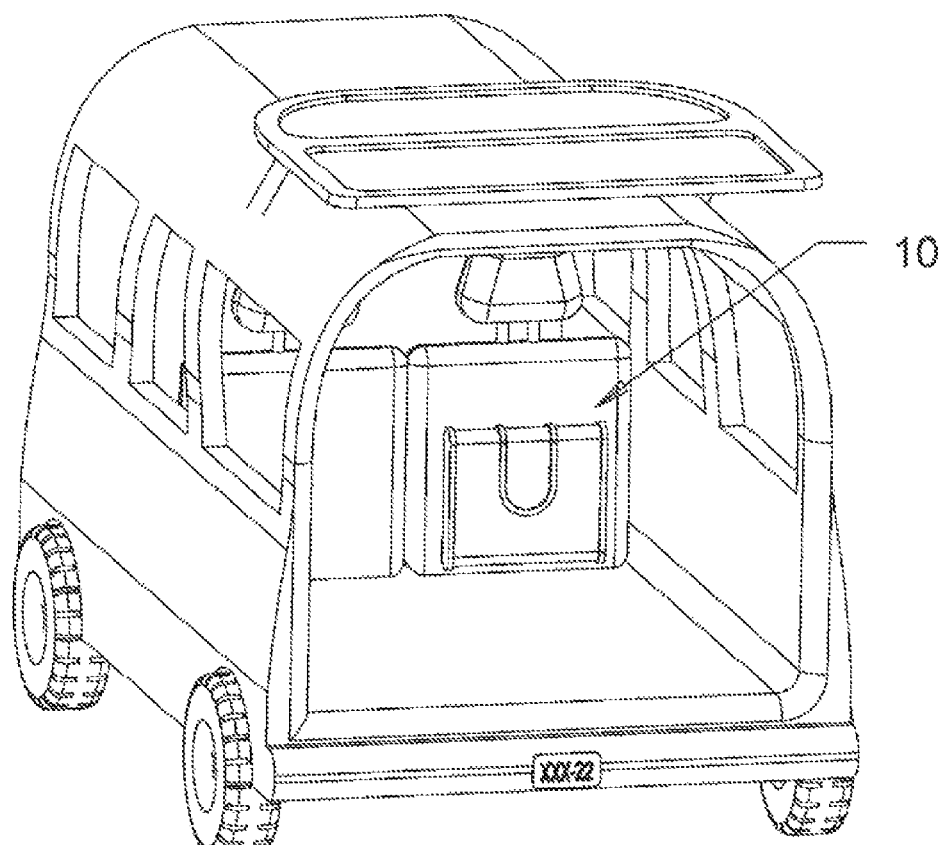
FIG. 8 is an isometric view of the closed fully folded baby changing station attached to the rear seat of a station wagon or hatchback automobile.
Figure 9:
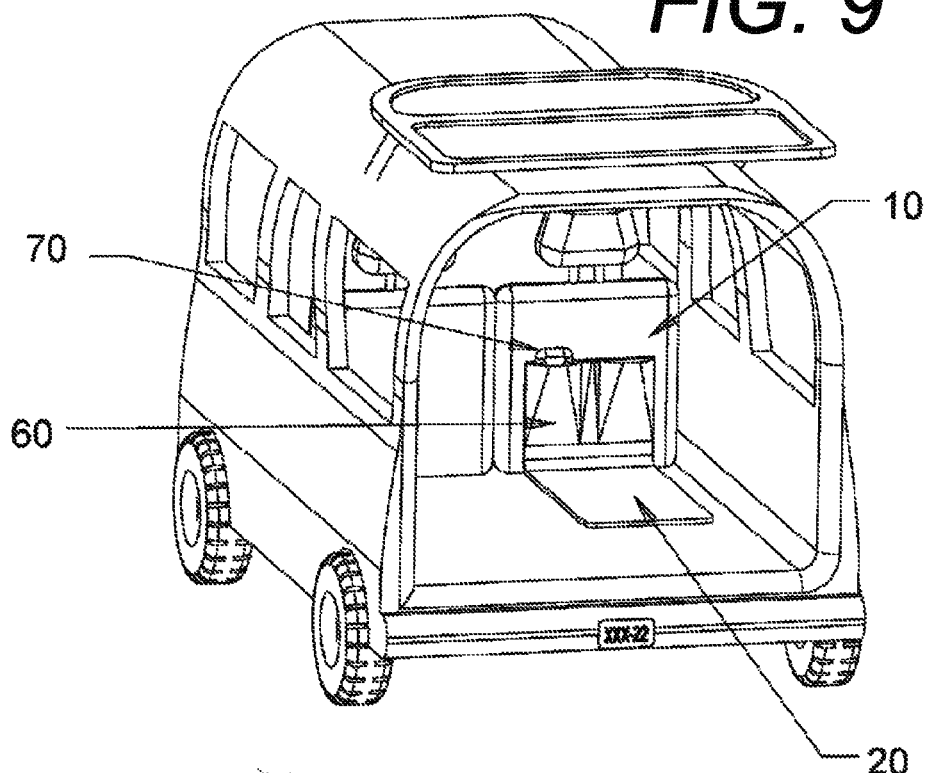
FIG. 9 is an isometric view of the unfolded baby changing station attached to the rear seat of a station wagon or hatchback automobile.
Figure 10:
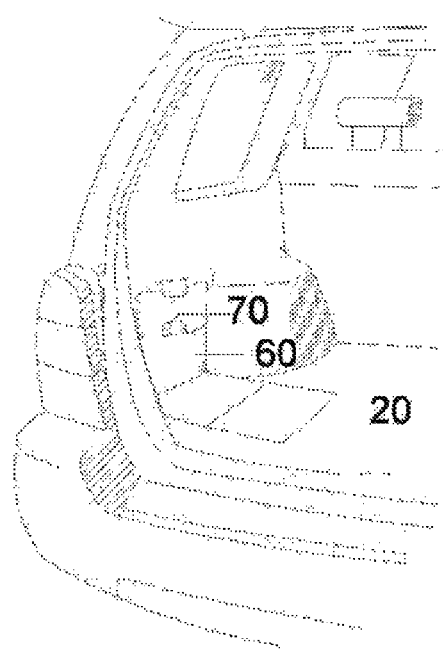
FIG. 10 is an isometric view of the unfolded baby changing station attached to the side of the rear compartment of a station wagon or hatchback automobile.

FIGS. 1, 2, and 3 show the baby changing station 10 of the present invention in the open position which allows the baby to be changed. FIGS. 1 and 2 are top and bottom plan views, while FIG. 3 is an elevation illustrating the fastening element 40 which is shown as Velcro material. The changing station 10 is constructed from a soft flexible material 20 such as vinyl or nylon. Fastening element 30 is a strip of Velcro loop material (stiff side) while fastening element 40 is a strip of Velcro hook material (softer side). When folded along the two fold lines 50, the changing station folds into the compact form shown in the isometric views of FIGS. 6 and 7. Shown in FIG. 4 is a fastening flap 25 that holds the device in the folded position. The fastening flap 25 may comprise strips of hook-and-loop fastening fabrics, 30 and 40, but is not limited this type of fastening. For example, a snap may be used to maintain the device in its folded position. FIGS. 4, 5, 6, and 7 are isometric views of the baby changing station. FIG. 4 shows the changing station in the open position ready to facilitate changing the baby's diaper, as it would be used when attached to a vertical member in the rear of a station wagon or hatchback automobile. The accessories are mounted vertically, while the baby is placed on the horizontal portion. FIG. 5 shows the device when partially folded. FIG. 6 shows the front of the device when fully folded, while FIG. 7 shows the rear of the device when fully folded. In FIG. 7, note the two hook-and-loop strips that may be used to attach the device to a seat or vertical member in the rear of the automobile. Referring to FIG. 1, a single pocket 60 is shown. However, as shown in FIG. 4, multiple pockets 60 may be placed in convenient positions on the device. The pocket 60 is also shown in FIGS. 9 and 10 to contain a diaper 70. Note that the fastening flap may grasp a handle on the rear seat of the vehicle as an alternate means of attaching the device to the rear seat. FIGS. 8 and 9 show the device attached to the back of the rear seat of the automobile. FIG. 10 shows the device attached to the side of the rear compartment of the automobile.

Typical dimensions of the device will be between 3 and 3½ feet long by between 1 foot to 1¼ feet wide. It will have netted nylon pockets 60 and a Velcro closure. There will be three pockets. Two pockets will be six-inches each, and the third pocket will be two-inches. It will also have a double-sided Velcro tab to keep the device fastened to the automobile.

The baby changing station 10 can be affixed to the hatch back portion of an SUV, minivan, or station wagon using double-sided Velcro or some other detachable fastener. Once attached to the hatch, the device may be unfastened and unfolded to be used for changing. The baby can then be placed on the unfolded top surface 20, and the pockets 60 will be accessible to retrieve a diaper 70, a wipe, or ointment. Once done, the parent can wipe the changing station clean, fold it up, and leave it attached to the car for next time.

While the design is best suited for an automobile with a hatch such as an SUV, station wagon, cross-over vehicle, etc., it can also be used in a sedan. The changing station can be stored in the rear seat pocket and laid out on the back seat or on the front passenger seat (if the front seat is a couch rather than a pair of bucket seats) for diaper changing. Another option would be to unfold the baby changing station on the floor of the back seat.

It is to be understood that while certain aspects of the disclosed subject matter have been shown and described, the disclosed subject matter is not limited thereto and encompasses various other embodiments and aspects.

Having thus described the invention, what is claimed as new and desired to be secured by Letters Patent is:

1. A method of deploying a diaper changing station within a motor vehicle, the method comprising the steps:
    placing a first portion of a diaper changing station against a substantially vertical interior portion of a stationary motor vehicle such that said diaper changing station is in a first, stowed, orientation;
    said first portion comprising an upper first end and a lower second end, wherein said first portion further comprises a foldable flap member foldably attached to the upper first end of said first potion, said foldable flap member for securing the changing station into a folded, substantially vertical, stowed position and for unsecuring the diaper changing station into an unfolded, extended, operable position;
    unfolding a second portion away from said first portion of said diaper changing station such that said second portion is placed against a substantially horizontal interior portion of said motor vehicle;
    said second portion comprising a first end and a second end, wherein said second portion is foldably attached along its first end to the lower second end of the first portion;
    unfolding a third portion away from said second portion of said diaper changing station such that said third portion is placed against said substantially horizontal interior portion of said motor vehicle, and such that said diaper changing station is in a second, operable, position; and
    said third portion comprising a first end and a second end, wherein said third portion is foldably attached along its first end to the second end of the second portion.

2. The method according to claim 1, further comprising the steps:
    said first portion of said diaper changing station further comprising a first portion of a coupling element;
    said vertical interior portion of said stationary motor vehicle further comprising a second coupling element; and
    removably attaching said first portion of said diaper changing station to said vertical interior portion of said stationary motor vehicle further by connecting said first coupling element to said second coupling element.

3. The method according to claim 2 wherein said first coupling element is selected from the list comprising: hook and loop fastener, a button, a snap, a snap receptacle, a zipper.

4. The method according to claim 2, wherein said first coupling element comprises a hook portion of a hook-and-loop fastener, and wherein said second coupling element comprises a cloth material covering said vertical interior portion of said stationary motor vehicle.

5. The method according to claim 4, wherein said vertical interior portion of said stationary motor vehicle is the rear face of said vehicle's seat.

6. The method according to claim 4, wherein said vertical interior portion of said stationary motor vehicle is the interior face of a vehicle wall panel.

7. The method according to claim 1, further comprising the steps:
- said third portion of said diaper changing station further comprising a first coupling element;
- said horizontal interior portion of said stationary motor vehicle further comprising a second coupling element; and
- removably attaching said third portion of said diaper changing station to said vertical interior portion of said stationary motor vehicle further by connecting said first coupling element to said second coupling element.

8. The method according to claim 7 wherein said first coupling element is selected from the list comprising: hook and loop fastener, a button, a snap, a snap receptacle, a zipper.

9. The method according to claim 1, wherein said diaper changing station is further comprised of an inner layer of flexible, padded material substantially surrounded by a durable, washable, outer lining.

10. The method according to claim 9, wherein said outer lining comprises a material selected from the list comprising: plastic, vinyl, and nylon.

11. The method according to claim 1, further comprising the steps:
- changing a diaper while said diaper changing station is in said second, operable orientation;
- folding said third portion of said diaper changing station against said second portion of said diaper changing station;
- folding the combination of second portion and third portion of said diaper changing station against said first portion of said diaper changing station;
- detaching said first portion of said diaper changing station from said vertical interior portion; and
- storing said diaper changing station within said stationary motor vehicle.

12. The method according to claim 11, further comprising the steps:
- wherein said diaper changing station further comprises a foldable flap member having a first portion and a second portion, wherein said first portion comprised of a first coupling element and the second portion is further comprised of a second coupling element;
- detachably attaching the first coupling element to the second coupling element; and
- securing said second portion and said third portion of said diaper changing station against said first portion of said diaper changing station in a substantially vertical position with said foldable flap member.

13. The method according to claim 12 wherein said first coupling element is selected from the list comprising: hook and loop fastener, a button, a snap, a snap receptacle, a zipper.

14. The method according to claim 1, wherein said first portion of said diaper changing station comprises a pocket.

15. The method according to claim 1, wherein said second portion of said diaper changing station comprises a pocket.

16. The method according to claim 1, wherein said third portion of said diaper changing station comprises a pocket.

* * * * *